July 8, 1947.
H. T. BUDENBOM
2,423,437
DIRECTION FINDER
Filed Aug. 25, 1934
2 Sheets-Sheet 1
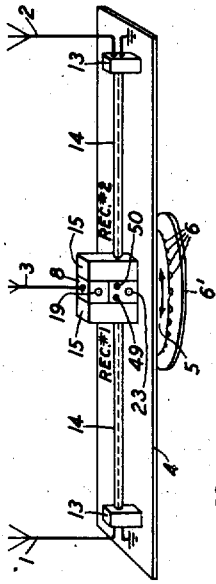
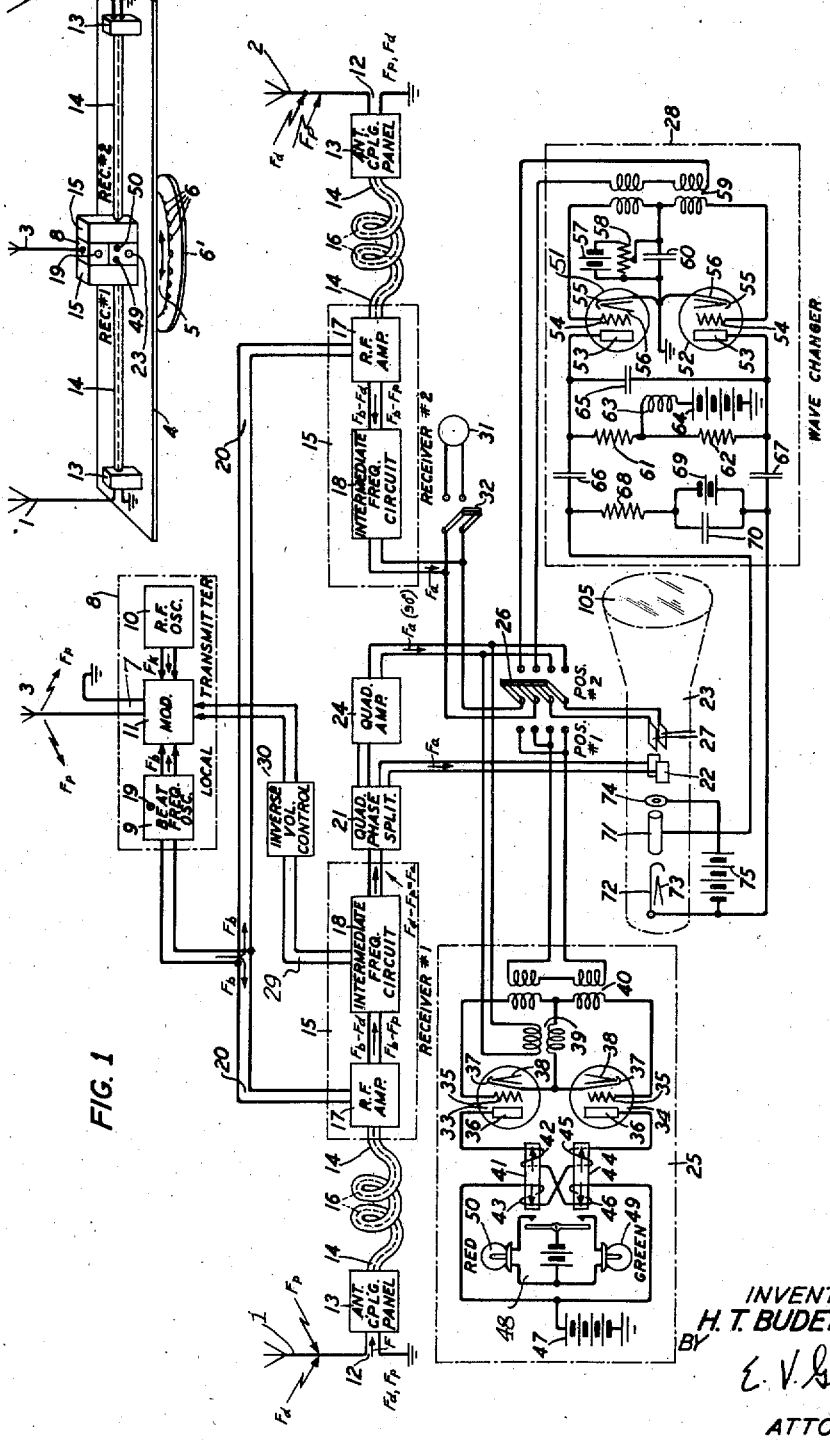
INVENTOR
H. T. BUDENBOM
BY
E. V. Griggs
ATTORNEY July 8, 1947.  H. T. BUDENBOM  2,423,437
DIRECTION FINDER
Filed Aug. 25, 1934  2 Sheets-Sheet 2

INVENTOR
H. T. BUDENBOM
BY
E. V. Griggs
ATTORNEY

Patented July 8, 1947

2,423,437

UNITED STATES PATENT OFFICE 2,423,437

DIRECTION FINDER

Horace T. Budenbom, Short Hills, N. J., assignor to Bell Telephone Laboratories, Incorporated, New York, N. Y., a corporation of New York Application August 25, 1934, Serial No. 741,372

20 Claims. (Cl. 250—11)

This invention relates to direction finders and especially to means and methods for determining the sense and direction of short radio waves.

In the past the results achieved in determining the direction of short waves, that is, waves having a length less than two hundred meters, have not been in general as satisfactory as those obtained in the case of the longer waves. One reason for this fact appears to be that long waves travel usually along the earth's surface and remain vertically polarized during their propagation substantially, whereas short waves usually intercept, probably as a result of reflection from the Heaviside layer, the receiving antenna in the form of horizontally and vertically polarized components. While loop antenna or equivalent structure may therefore be employed advantageously in the case of long waves, such absorbing structure is not generally satisfactory for short waves.

One system which has been employed with some success for determining the direction of short waves is described in the article "Oscillographic observations on the direction of propagation and fading of short waves" by H. T. Friis, published in the Proceedings of Institute of Radio Engineers May 1928, page 658. In that system two spaced antennas are rotated about the same axis to a position at which the absorbed wave components are in phase, the bi-lateral direction or path of the wave being perpendicular to the plane of the antennas in this position. The present invention relates particularly to improvements in direction finders having spaced vertical antennas as in the system just described.

It is one object of this invention to determine the direction of radio waves of any wave-length in a more accurate manner than heretofore accomplished.

It is another object of this invention to determine the direction of short waves in a manner eliminating the effect of the horizontally polarized component of said wave.

It is a further object of this invention to determine simultaneously and quickly both the path and directional sense of a short radio wave.

It is still another object of this invention to vary the intensity of a wave received from or generated by one source directly in accordance with the intensity variations in a wave received from another source.

It is still another object of this invention to adjust, for desired operating frequencies, at least one transmitting system and a plurality of receiving systems simultaneously at a single operating position.

According to this invention two spaced non-directional receiving antennas and a small non-directional transmitting antenna spaced equally therefrom are mounted for simultaneous rotation, as for example, on a turntable. A local heterodyne oscillator supplies to the transmitting antenna a wave differing by a given audio-frequency from the incoming, unmodulated short wave carrier intercepted by the receiving antennas. The receiving antennas are connected to individual heterodyne receivers each of which includes means for rendering the phase shifting characteristics of the two receivers similar, whereby the detected low-frequency currents have the same phase relation as the carrier components absorbed by the receiving antennas. The heterodyne transmitter and the heterodyne receivers are tuned by means of a single control comprising a variable common beat frequency oscillator included in the transmitter and the intensity of the locally transmitted wave is varied in accordance with the intensity variations in the incoming carrier. A quadrature current component obtained from one of the detected currents produces a circular trace on a cathode ray tube and pulses produced from the other detected current vary, oppositely, the intensities of semi-circular portions of said trace, the orientation of the diameter common to said portions with respect to a reference position of said diameter being an indication from which the direction and sense of the waves may be ascertained. In an alternative arrangement the two detected currents are supplied directly to the cathode ray tube deflector plates whereby an elliptical trace is produced which becomes a straight line when the turntable is rotated to a position at which the plane of the antennas is perpendicular to the path of the incoming wave.

The invention will be more fully understood from the following description taken in connection with the drawing on which like reference numerals designate elements of similar function and on which:

Fig. 1 is a schematic circuit illustrating one embodiment of the invention;

Fig. 2 illustrates a rotatable structure on which the system of Fig. 1 is mounted;

Figure 3:
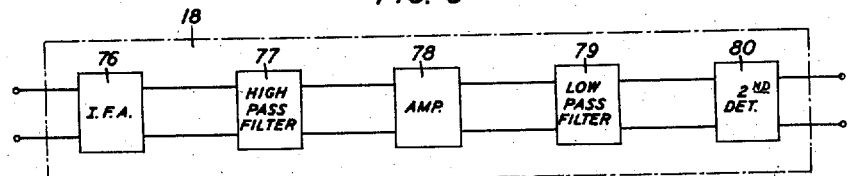
Fig. 3 illustrates, in detail, the intermediate frequency circuit included in each of the two heterodyne receivers of the system of Fig. 1.

Referring to Figs. 1 and 2, reference numerals 1 and 2 designate non-directional vertical receiving antennas and numeral 3 designates a local transmitting antenna, which antennas are mounted on a turntable comprising platform 4, rotatable structure 5, wheels 6, and support 6'. The details of the structure for mechanically rotating the turntable have been omitted for the sake of simplicity. Obviously various structures may be satisfactorily employed for performing this function. Antenna 3 is positioned equally distant from, and preferably in the same plane with, antennas 1 and 2. This antenna is connected by means of line 7 to a heterodyne transmitter 8 comprising beat frequency oscillator 9, substantially constant frequency oscillator 10 and modulator 11. Antennas 1 and 2 are connected by lines 12 to similar receiving equipments each comprising antenna coupling panel 13 including an amplifier, a concentric line 14 and an heterodyne receiver 15. Each concentric line 14 includes one or more choke coils 16, each comprising a coiled portion of the outer concentric line conductor and a coiled portion of the inner conductor. Each heterodyne receiver 15 includes a radio frequency amplifier and first detector 17, and an intermediate frequency circuit 18 including a second detector. The second detector is arranged to suppress undesired harmonics. The frequency of the wave from beat frequency oscillator 9 is controlled by tuning control 19 and this oscillator supplies over line 20 a frequency to each of the heterodyne receivers 15. While energy from the modulator 11 of the transmitter is preferably transmitted through the ether, it may of course be conducted by means of wires to the input circuits of the two heterodyne receivers 15.

The heterodyne receiver 15 associated with antenna 1 and hereinafter referred to as receiver No. 1 is connected to a quadrature phase splitter 21 having two pairs of terminals, one of which supplies a current in phase with the input current and the other of which supplies a current in quadrature thereto. The in-phase output terminals are connected directly to deflector plates 22 of the cathode ray tube 23 and the quadrature output terminals are connected to the quadrature amplifier 24 which has negligible phase shift. The output of the quadrature amplifier 24 is connected directly to the sense determination circuit 25, as will be explained in more detail later, and when switch 26 is thrown to position No. 2, it is connected to the other pair of deflector plates 27 of cathode ray tube 23.

The output terminals of the heterodyne receiver 15 associated with antenna 2 and hereinafter referred to as receiver No. 2 are connected when switch 26 is in position No. 1 to the sense determination circuit 25 and to deflector plates 27 of tube 23. When switch 26 is in position No. 2, the output of receiver No. 2 is connected to the input of the wave changer 28. The intermediate frequency circuit 18 of receiver No. 1 is connected by line 29 and through the inverse volume control 30 to the heterodyne oscillator transmitter 8. Reference number 31 designates a telephone which may be connected by means of switch 32 to the output of receiver No. 2, receiver No. 1 and heterodyne transmitter 8 being preferably disconnected by switching means not shown when voice waves are being received. If it be desired to receive interrupted continuous wave telegraph signals, oscillator 10 may be connected to the intermediate frequency circuit for monitoring purposes.

The sense determination circuit 25 comprises two tubes 33 and 34 arranged in push-pull and each having a control grid 35, an anode 36, a cathode 37 and means for heating said cathode comprising filament 38 and a source of energy, not shown. Reference number 39 designates a transformer, the primary winding of which is connected to the quadrature amplifier 24 and the secondary winding of which is connected to the grid or control electrodes 35 of tubes 33 and 34 in such a manner as to impress in-phase potentials on said grids. Reference number 40 designates a transformer, the primary of which is connected to the output of receiver No. 2 when switch 26 is in position No. 1 and the two-winding secondary of which is connected to the grids 35 in such a manner as to impress oppositely phased potentials on said grids. The output circuits of the push-ball tubes 33 and 34 include differential relay 41 having windings 42 and 43 and differential relay 44 having windings 45 and 46, one of the two windings of each relay being connected to the anodes of tube 33 and the other to the anodes of tube 34. The relays and anodes of tubes 33 and 34 are energized by means of battery 47. Reference number 48 designates a battery which supplies energy to green lamp 49 when the contacts of relay 44 are closed and to red lamp 50 when the contacts of relay 41 are closed.

The wave changer 28 comprises two tubes 51 and 52 each having an anode 53, a control electrode 54, a cathode 55, and a filament 56 associated with a source of energy (not shown) for heating cathode 55. Battery 57 and resistance 58 function as a means of impressing a negative potential on the grids of tubes 51 and 52. When switch 26 is in position No. 2, the output of receiver No. 2 is connected by means of transformer 59 to the control grids of tubes 51 and 52, the arrangement being such that oppositely phased potentials are impressed on the grids 54. Reference number 60 designates a by-pass condenser. The anode 53 of tube 51 is connected through resistance 61, and the anode 53 of tube 52 through resistance 62 to a choke coil 63 and anode battery 64. Reference number 65 designates a condenser having a critical charging rate, as will be described later. The resistance 61 is connected by means of coupling condenser 66 and the resistance 62 by means of coupling condenser 67 to opposite terminals of a biasing circuit comprising resistance 68, battery 69, and by-pass condenser 70, this circuit being a means to negatively bias the control electrode 71 of tube 23. The cathode 72 of tube 23 is heated by means of a filament 73 energized by a source of energy, not shown, and the anode 74 is maintained at a positive potential by means of battery 75.

Fig. 3 illustrates the details of the intermediate frequency circuit 18 included in each of receivers No. 1 and 2. In Fig. 3 reference number 76 designates an intermediate frequency amplifier, number 77 a high-pass filter, number 78 an amplifier, number 79 a low-pass filter, and number 80 a second detector.

Figure 4:
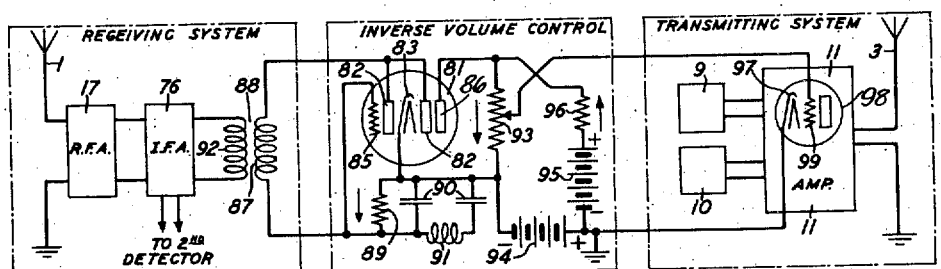

Referring to Fig. 4, the inverse volume control 30 comprises a double diode-triode tube 81 having two directly connected anodes 82, a cathode 83 which is heated by filament 84, a control electrode 85 and another anode 86. The input circuit of the rectifier portion of tube 81 includes secondary winding 87 of transformer 88, a resistance 89, and radio frequency by-pass circuit comprising condensers 90 and choke coil 91. The primary winding 92 of transformer 88 is energized by a portion of the output of an intermediate frequency amplifier 76. The input circuit of the amplifier portion of the tube comprises resistance 89 connected between the control electrode 85 and the cathode 83. The output circuit of the amplifier portion comprises a volume control resistance 93 connected in shunt to a series circuit comprising biasing battery 94, anode battery 95 and resistance 96. The positive terminal of battery 94 and the negative terminal of battery 95 are connected to the cathode 97 of the amplifying tube 98 in the modulator 11, and the control resistance 93 is connected to the control electrode 99 of this amplifying tube. The inverse volume control may obviously be connected to a plurality of tubes included in the heterodyne oscillator.

Figure 5:
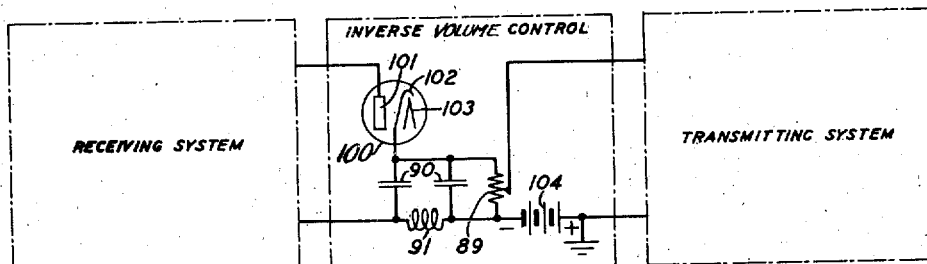
Figs. 4 and 5 illustrate different embodiments of the inverse volume control which are suitable for use in the system of Fig. 1.

The inverse volume control 30 may comprise a rectifier tube unassociated with an amplifier, as illustrated by Fig. 5. In Fig. 5 reference number 100 designates a rectifying tube comprising an anode 101, a cathode 102 which is heated by the filament 103 energized by a battery, not shown. Reference number 104 designates a biasing battery for the tubes to be controlled in the transmitting system, battery 104 being preferably smaller in magnitude than the battery 94 employed in the amplifying inverse control system illustrated by Fig. 4.

Referring now to Fig. 1 the operation of the invention will now be explained. Assuming that it is desired to determine the direction of an incoming wave having a radio frequency $F_d$, the beat frequency oscillator 9 is tuned by means of tuning control 19, to generate a wave having a very high radio frequency $F_b$ and this radio frequency is supplied together with a wave having a lower radio frequency $F_k$ from the constant frequency oscillator 10 to modulator 11 for the purpose of producing a radio wave having a difference radio frequency $F_p$ which difference frequency is smaller, let us assume, than the incoming radio frequency $F_d$ by an audio-frequency $F_a$ equal to the desired frequency of the detected currents. That is, $F_p = F_d - F_a$. The wave of frequency $F_p$ arrives at antennas 1 and 2 in similar phase. Components of the wave of frequency $F_d$, which components let us assume, are out of phase, are absorbed by antennas 1 and 2 and supplied with the wave of frequency $F_p$ to receivers No. 1 and No. 2. The choke coils 16 function to prevent energy absorbed by lines 14 from affecting the receivers. In the radio frequency amplifier and first detector 17 of each receiver, waves of frequency $F_d$ and $F_p$ are subtracted, in effect, from the beat frequency $F_b$ supplied by the oscillator 9 to produce two intermediate frequencies $F_b - F_p$ and $F_b - F_d$. In the intermediate frequency circuit of each receiver these two intermediate frequencies are combined to produce a detected current having a frequency equal to $$F_b - F_p - (F_b - F_d) = F_d - F_p = F_a$$

The two detected currents of frequency $F_a$ will have the same phase relation as the components of the wave $F_d$ absorbed by antennas 1 and 2. In practice the beat frequency 9 is adjusted by control 19 so that for different values of incoming frequency $F_d$ the detected current has the same frequency value $F_a$.

It should be specially noted that in accordance with this invention the transmitting system comprising the heterodyne transmitter 8 and the two receiving systems comprising heterodyne receivers 15 are simultaneously tuned or adjusted by the single control 19, and the necessity of employing in systems of this type several operators is, therefore, eliminated.

Figure 6:
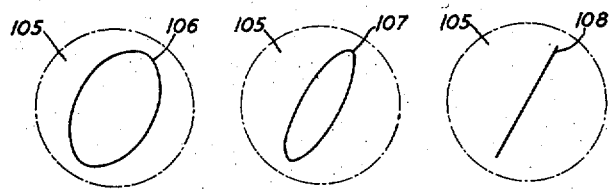
Figs. 6 and 7 illustrate the alternative indications produced on the cathode ray tube included in the system of Fig. 1.

Assuming that switch 26 is in position No. 1, a component of the detected current $F_a$ from the detector in the intermediate frequency circuit of receiver No. 1 passes through the phase splitter 21 without phase change and this component, hereafter termed the "in-phase" component, is supplied to deflector plates 22 of the cathode ray tube 23. The detected current $F_a$ from receiver No. 2 is supplied to deflector plates 27. The resultant indication on the screen 105 of the tube 23 is an ellipse such as illustrated by Fig. 6. In Fig. 6 the ellipse 106 represents the indication obtained when the phase difference is relatively large and the ellipse 107 represents the indication when the difference is relatively small. If it be desired to determine only the direction or path of the incoming wave, the turntable comprising platform 4 may be rotated in a clockwise or counter-clockwise manner until the plane of antennas 1 and 2 is perpendicular to the path, which condition is indicated when the straight line pattern designated by the number 108 in Fig. 6 is obtained. If it be desired to determine the directional sense of the incoming wave the platform or turntable is rotated in a manner dependent upon the indication provided by the sense determination circuit as will now be explained.

With the switch still in position No. 1, the sense determination circuit 25 receives energy from the low-frequency quadrature amplifier connected to receiver No. 1 and through switch 26 from receiver No. 2, the quadrature potential from receiver No. 1 being impressed in like phase and the in-phase potential from receiver No. 2 in opposite phase, on the control electrodes 35 of the push-pull tubes 33 and 34. If the components of wave $F_d$ absorbed by antennas 1 and 2 are not in phase the potentials impressed on the control electrodes of tubes 33 and 34 are not in quadrature. Assuming that the phase difference between the potentials impressed upon grid 35 of tube 33 is larger than 90 degrees when the current in antenna 1 leads that in antenna 2, the phase relation of the potentials impressed on the control grid 35 of tube 34 will be less than 90 degrees. Consequently, the current through windings 42 and 46 will be less than the current through windings 45 and 43 and the green lamp 49 will become energized. On the drawing the arrows shown on the relay winding indicate the direction of the magnetic force produced by the currents from tubes 33 and 34. Conversely, when the current in antenna 2 leads that in antenna 1 the red lamp becomes energized. When the currents in the two antennas are in phase both lights are extinguished.

In practice, a clockwise rotation for a green light indication and a counter-clockwise rotation for a red light indication are arbitrarily chosen. The operator who faces the receivers and the control panel containing the cathode ray tube and indicating lamps (see Fig. 2), rotates the turntable in a clockwise or counter-clockwise manner dependent upon the indication given by the lamps. When the turntable has been rotated until both lamps are extinguished he will face toward the incoming wave.

Referring to Fig. 3, the high-pass and low-pass filters function to render the phase shifting characteristics of the intermediate frequency circuits included in the receivers linear over a band of frequencies including the two intermediate frequencies $F_d-F_b$ and $F_p-F_b$. By utilizing intermediate frequency circuits having similar phase shifting characteristics the two receivers in effect are matched and the phase relation between the absorbed components of wave $F_d$ is in effect accurately reproduced by the two detected currents $F_a$.

Referring to Fig. 4, the operation of the inverse volume control included in the system of Fig. 1 will now be described. The intermediate frequency current is impressed by means of transformer 88 on the diode elements of tube 81 and the rectified potential across resistance 89 is impressed upon the control terminal of the amplifying portion of tube 81. The control electrode of the tube 98 to be controlled is normally negatively biased, the negative potential being equal to the negative potential of the battery 94 minus the positive potential across a portion of resistance 93. An increase in the incoming signal absorbed by antenna 1 results in an increase in the rectified current through resistance 89 and an increase of the negative potential on control electrode 85. The increase in this negative potential causes a larger current to flow through resistance 93 whereby the bias on the control electrode of the tube 98 is rendered more positive and a larger signal is transmitted by antenna 3. Conversely, a decrease in the incoming signal absorbed by antenna 1 causes a decrease in the intensity of the signal transmitted by antenna 3.

Fig. 5 is similar in operation to the system of Fig. 4. As a signal supplied to tube 109 in the system of Fig. 5 increases, the drop across resistance 89 increases whereby the negative or control bias comprising the negative potential of battery 104 minus the positive potential across a portion of resistance 89 and supplied to the transmitting system is rendered less negative. Conversely, when the signal received by the receiving system decreases the drop across resistance 89 decreases and a larger negative control bias is supplied to the transmitting system.

Figure 7:
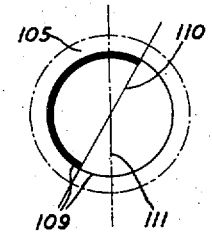

Referring again to Fig. 1 and to Fig. 7 the system for determining simultaneously both the direction and sense of the incoming wave without rotation of the turntable will be described. Assuming that switch 26 is thrown to position No. 2 the in-phase current component and the quadrature phase current component of the detected current $F_a$ supplied by receiver No. 1 to the two pairs of deflector plates of the cathode ray tube produce a circular trace on the screen 105, as illustrated by the trace 109 of Fig. 7. The in-phase detected current $F_a$ from receiver No. 2 is supplied to the wave changer 28 which functions to change the sinusoidal wave into a square-topped wave, substantially. In the output circuit of the wave changer the resistances 61 and 62 and the condenser 65 have such electrical values that during one half cycle a pulse will be transmitted in a given direction through condenser 66 and resistance 68 and during the next half cycle a similar pulse in the opposite direction will be transmitted through condenser 67 and resistance 68. The normal biasing potential supplied by battery 69 to the control electrode 71 of tube 23 will, therefore, be reinforced during one half cycle and decreased during the next half cycle, and the intensity of the circular cathode ray tube trace will be correspondingly increased during one half its excursion and decreased during the other half. Assuming that the common diameter 110 of the semi-circular trace portions so obtained coincides with the reference line 111 when the detected current $F_a$ from receiver No. 2 agrees in phase with the in-phase component of the detected current $F_a$ from receiver No. 1, the orientation actually observed at any position of the turntable of the common diameter with respect to said reference line will be an indication of the direction and the directional sense of the incoming wave with respect to the plane of the antennas 1 and 2. Since the orientation or compass bearing of the plane of the antennas may easily be determined, the bilateral direction and compass directional sense of the incoming wave may be determined.

Although the invention has been described in connection with certain specific embodiments, it is to be understood that it is not to be limited to such embodiments and that component parts and apparatus other than described may be successfully employed in the invention. Moreover, it should be understood that the invention may be satisfactorily used for determining the sense and direction of waves of any wave-length.

What is claimed is:

1. The method of determining the sense and direction of an incoming wave which comprises obtaining two currents of the same frequency from two separately and non-directionally absorbed components of said wave, producing a circular representation of one of the currents, and causing the other current to alter a particular point or portion of said representation dependent upon the phase relation of said components as absorbed.

2. The method of determining the sense and direction of an incoming wave which comprises non-directionally and separately absorbing energy from only two vertically polarized components of said wave, obtaining from the absorbed energies two currents having the same phase relation as said components, producing a circular representation of one of the currents, causing the other current to produce a maximum luminosity change at a particular point or portion of said representation corresponding to the amount and sense of the phase difference between the absorbed energies, and observing the orientation of said portion with respect to a predetermined reference position of said portion.

3. The method of determining the sense and direction of a radio wave utilizing a cathode ray indicator, which comprises separately and non-directionally absorbing energy representing only two vertically polarized components of said wave, obtaining from the absorbed energies two currents having the same phase relation as said components, obtaining from one of the currents a quadrature current component, causing said quadrature component and said one of said currents to produce a circular trace on the indicator, causing the other current to oppositely vary the intensities of two-particular semi-circular portions of said trace dependent upon the amount and sense of the phase difference between the absorbed energies, and observing the orientation of the diameter common to said portions with respect to a reference position of said diameter.

4. In a direction finding system, means comprising a pair of spaced non-directional antennas for obtaining two currents representing two separately absorbed components of an incoming wave, means for obtaining a circular indication of one of said currents and means controlled by the other current for changing a particular point or portion on said indication dependent upon the phase difference between said components.

5. In a short wave direction finding system, means for separately absorbing energy from only two vertically polarized components of an incoming wave, means for obtaining therefrom two currents of the same frequency, means for producing a circular representation of one of said currents, and means controlled by the other current for producing a maximum change in luminosity at a particular portion of the representation produced, the orientation of the altered portion with respect to a predetermined reference line being dependent upon the amount and sense of the phase difference between said components as absorbed and an indication of the direction and sense of said wave when differently phased components are absorbed.

6. In a short wave direction finding system, means comprising a plurality of non-directional vertical antennas for simultaneously absorbing different components of a carrier wave, means for producing from said components two low frequency currents having the same phase relation as that of the absorbed components, a cathode ray indicator, means energized by one of the low frequency currents for producing a circular trace on said indicator, and means energized by the other low frequency current for changing the intensity of one half of said trace, the orientation of said half trace with respect to a predetermined reference position being dependent upon the phase relation of the components as absorbed and an indication of the direction and sense of said wave.

7. In a short wave direction finder, a pair of spaced non-directional receiving antennae, separate receivers connected thereto, a quadrature phase splitter connected to the output of one of the receivers, a wave changer adapted to change a sinusoidal wave into a square wave substantially, and an energized cathode ray tube indicator, one pair of the output terminals of said phase splitter being connected to one pair of tube deflector plates and the remaining pair of output terminals being connected to the other pair of tube deflector plates, and the wave changer being included between said other receiver and the control terminals of said tube.

8. In an electrical system, means for simultaneously receiving electrical waves of different frequency from a plurality of sources, means for modulating said waves with a beat frequency current and means for automatically causing the intensity of only one of the waves to vary directly in accordance with the intensity variations of the other wave, whereby the modulation products are of comparable intensity.

9. In an electrical system, means for generating electrical energy, means for receiving said energy and energy of variable intensity from another source, and means for automatically regulating the intensity of only the generated energy to vary directly with the variable intensity of the energy received from said other source.

10. In a radio system, two antennas arranged to receive a first wave of frequency $F_d$, separate receivers connecting said antennas to a common translation device, means for generating and supplying to said receivers a second wave of frequency $F_p$ where $F_d - F_p$ equals frequency $F_a$, means included between one of the receivers and said first mentioned means for varying the intensity of said second wave $F_p$ in accordance with the intensity variations in said first wave $F_d$, whereby the intensities of the two resultant currents of frequency $F_a$ are rendered constant.

11. In a radio system, a first transmitting system, two receiving systems each for receiving a wave from said first transmitting system and a wave from a second transmitting system, each receiving system comprising a heterodyne receiver, said receivers being connected to a common low frequency translation device, said receiving systems and said first transmitting system having a common variable beat frequency oscillator for adjusting the operating frequency range of said systems, whereby the two receiver detected currents derived from the waves received from the two transmitting systems and beat oscillator are of the same frequency and possess the same predetermined frequency, regardless of the frequency of the wave received from the second transmitting system.

12. In a radio system, a transmitting antenna, a heterodyne transmitter connected thereto, two receiving antennas equally spaced from said transmitting antenna, a cathode ray tube indicator, separate heterodyne receivers connecting said receiving antennas to said indicator, said heterodyne transmitter and heterodyne receivers having a single tuning means comprising a common variable beat frequency oscillator, whereby an adjustment of said oscillator for the purpose of tuning said receivers for a desired wave automatically adjusts said transmitting system to transmit to the receiving antenna a wave of a frequency such that the frequency of the detected currents supplied to the indicator is maintained unchanged, substantially.

13. In a short wave direction finder, a rotatable structure, a non-directional transmitting antenna mounted thereon, a heterodyne transmitter connected to said antenna, a pair of non-directional receiving antennas mounted on said structure and spaced equally from said transmitting antenna, said receiving antennas being arranged to receive the wave radiated by said transmitting antenna and another incoming wave, separate heterodyne receivers connected to said receiving antennas, said heterodyne transmitter and heterodyne receivers having a common variable beat frequency oscillator, the intermediate frequency portions of each heterodyne receiver being arranged to have similar phase shifting characteristics, means for regulating the intensity of the wave radiated by said transmitting antenna in accordance with the intensity variations in the intermediate frequency waves produced, a quadrature phase shifter connected to one receiver, a square wave producer, a cathode ray tube indicator, and means for alternatively connecting each receiver directly in effect to different pairs of deflector plates of said tube, or connecting the phase shifter to one pair of deflector plates and the associated receiver directly to the other pair of deflector plates and the other receiver to the control electrodes of said tube through said wave producer, and means for determining the directional sense of the above mentioned incoming wave when the receivers are connected directly to the deflector plates of said tube.

14. In a radio system, a first transmitter, a receiver for receiving a wave from said transmitter and a wave incoming from a second transmitter, and a single beat frequency oscillator for modulating the incoming waves and for rendering before transmission the frequency of the wave from the said first transmitter different by a predetermined amount from the frequency of the wave from the second transmitter.

15. A method of determining both the sense and direction of a radio wave utilizing two vertical antennas mounted on a turntable, which comprises obtaining two currents representing simultaneously absorbed differently phased components of said wave and having the same phase relation as said components, shifting the phase of one of the currents 90 degrees, obtaining one indication when the phase of the resultant currents is greater than 90 degrees and a different indication when it is less than 90 degrees, rotating the plane of said antennas in a clockwise or counter-clockwise direction depending upon the indication received until the currents are in quadrature, whereby the plane of the antennas is rendered perpendicular to the direction of the wave and the wave impinges upon the antennas from a known side of said plane.

16. The method of determining the sense and direction of an incoming wave which comprises non-directionally and separately absorbing energy from only two vertically polarized components of said wave, obtaining from the absorbed energies two currents having the phase relation of said components, producing a circular representation of one of the currents, causing the other current to reinforce one portion of said representation and to weaken another portion thereof, and observing the orientation of said portions with respect to a common reference.

17. The method of determining the sense and direction of an incoming wave which comprises non-directionally absorbing energy from said wave, applying the absorbed energy to produce a circular representation thereof, separately absorbing energy from said wave, and applying said separately absorbed energy to alter a portion of said representation dependent upon the phase relation between the first mentioned absorbed energy and the second mentioned absorbed energy.

18. The method of determining the sense and direction of an incoming wave which comprises non-directionally absorbing at one location energy from said wave, applying the absorbed energy to produce a circular representation thereof, separately absorbing at another location energy from said wave, and applying said separately absorbed energy to alter a portion of said representation dependent upon the phase relation between the first mentioned absorbed energy and the second mentioned absorbed energy.

19. In a radio system, a local transmitting system, a receiving system positioned relatively close thereto and arranged to receive radio frequency waves of a given frequency from said local system and radio frequency waves of a different given frequency from a distant transmitting station, means for producing two intermediate frequency waves from said radio frequency waves, and means controlled by one of the intermediate frequency waves for causing the intensity of the locally transmitted waves to vary directly with that of the waves received from the distant station, whereby a current having a frequency substantially equal to the difference between said radio frequency waves may be obtained from the two intermediate frequency waves.

20. In combination, a plurality of superheterodyne receivers each arranged to receive simultaneously the same plurality of widely different carrier frequencies, each receiver comprising means for obtaining widely different intermediate frequencies from said carrier frequencies and a circuit for amplifying said intermediate frequencies, means comprising a high-pass filter and a low-pass filter included in each of said circuits for rendering their frequency-phase shift characteristics substantially the same over a frequency band including said widely different intermediate frequencies, and means for ascertaining the phase relation of the output currents of said receivers.

HORACE T. BUDENBOM.

REFERENCES CITED

The following references are of record in the file of this patent:

UNITED STATES PATENTS

| Number | Name | Date |
| --- | --- | --- |
| 1,907,471 | Alexanderson | May 9, 1933 |
| 1,881,483 | Gillett | Oct. 11, 1932 |
| 1,733,824 | Robinson | Oct. 29, 1929 |
| 1,849,632 | Moore | Mar. 15, 1932 |
| 1,888,065 | Beverage | Nov. 15, 1932 |
| 1,939,345 | Gerth | Dec. 12, 1933 |
| 1,916,358 | Bruce | July 4, 1933 |
| 1,642,173 | Round | Sept. 13, 1927 |
| 1,867,171 | Ranger | July 12, 1932 |
| 1,447,204 | Espenschied | Mar. 6, 1923 |
| 1,735,344 | White | Nov. 12, 1929 |
| 1,692,118 | Hanson | Nov. 18, 1928 |
| 1,933,248 | Evans | Oct. 31, 1933 |
| 1,699,567 | Ohl | Jan. 22, 1929 |
| 1,784,867 | Farrington | Dec. 16, 1930 |
| 984,108 | Roos | Feb. 14, 1911 |
| 1,559,992 | Schaffer | Nov. 3, 1925 |
| 2,103,865 | Nonnekens | Dec. 28, 1937 |
| 1,909,940 | Farnham | May 23, 1933 |

FOREIGN PATENTS

| Number | Country | Date |
| --- | --- | --- |
| 305,250 | Great Britain | Feb. 4, 1929 |

OTHER REFERENCES

Proceedings of the I. R. E., May 1928, vol. 16, No. 5, pp. 658–665, Article entitled "Oscillographic Observations on the Direction of Propagation and Fading of Short Waves," by H. T. Friis. (Copy in Div. 51.)